April 20, 1926.

R. R. CHILDS ET AL

NUT LOCKING DEVICE

Filed Feb. 12, 1926

1,581,531

Inventors
R. R. CHILDS
and G. H. Jakobsson

By Herman Jakobsson
Attorney

Patented Apr. 20, 1926.

1,581,531

UNITED STATES PATENT OFFICE.

ROBERT R. CHILDS, OF ROANOKE, VIRGINIA, AND GUSTAV H. JAKOBSSON, OF TAKOMA PARK, MARYLAND; SAID JAKOBSSON ASSIGNOR TO SAID CHILDS.

NUT-LOCKING DEVICE.

Application filed February 12, 1926. Serial No. 87,971.

*To all whom it may concern:*

Be it known that we, ROBERT R. CHILDS and GUSTAV H. JAKOBSSON, citizens of the United States, residing, respectively, at Roanoke, in the county of Roanoke and State of Virginia, and at Takoma Park, in the county of Montgomery and State of Maryland, have invented certain new and useful Improvements in Nut-Locking Devices, of which the following is a specification.

The present invention relates to improvements in nut locks and has for its object the providing of a device of this class which locks a nut on a bolt firmly without any possibility of the nut becoming loose or unscrewing after once having been tightened.

Another object of the invention is to provide a nut lock having the locking member inserted in a suitable recess in the bolt and interengaging means between the said member and the bolt to limit their relative movements.

The device is a further development of the co-pending application for nut-lock, Serial No. 68625, and is illustrated on the accompanying drawing where—

Figure 1:
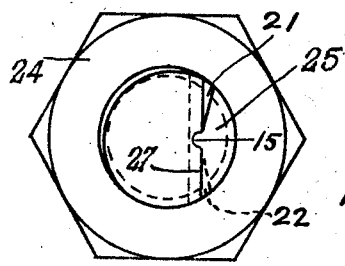
Figure 3:
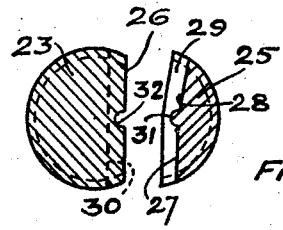
Figure 2:
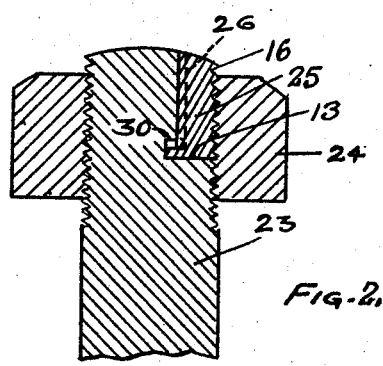
Figure 4:
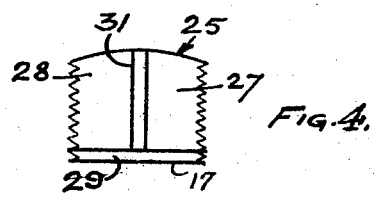
Figure 5:
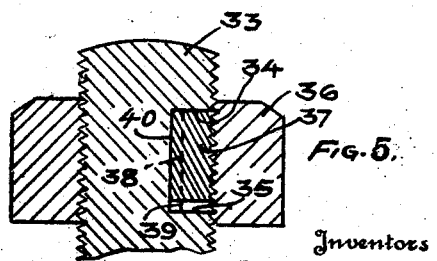

Fig. 1, shows a top plan view of the nut locking device;

Fig. 2 a vertical section of the device;

Fig. 3 a horizontal section of Fig. 5;

Fig. 4 a front elevation of the locking member used in Figs. 1, 2, and 3; and

Fig. 5 a modification illustrated in a fragmentary vertical section.

Referring to the form of the invention shown in Figs. 1, 2, 3 and 4 of the drawing, the bolt is indicated by reference numeral 23, the nut by 24, and the locking piece by 25. The flat wall 26 of the bolt and the flat side faces 27 and 28 of the locking piece 25 are here shown parallel with the bolt axis while these side faces are making an obtuse angle with each other.

In order to limit the axial displacement of the locking member 25, the latter is now provided with a transversely running ledge 29 adapted to engage in a corresponding channel 30, which is very slightly deeper than the thickness of the ledge 29. In this manner the swinging and limited axial displacement of the locking member 25 will act to lock the nut. Inter-engaging ridge 31 and groove 32 are provided to form a hinge connection for the rocking of the locking piece.

The locking piece 25 is constructed to fill the recess formed in the bolt, its threads 16 coinciding with those of the bolt and the nut 24 so that the nut can run down easily on the bolt. In the tightening operation of the nut, the locking piece 25 rests squarely with its bottom face 17 on the bottom 13 of the recess, while the ridge 31 engages in the groove 32 and the flat side 27 contacts with the flat wall 26 in the recess. In some cases the ridge and groove, 31 and 32, may be omitted.

When the nut 24 is being drawn up or tightened on the bolt 23 the parts will accordingly take the position indicated in full lines in Fig. 1 of the drawing, with a space 21 between the wall 26 and the flat side 28 of the locking member. When the operation is reversed, that is, when the nut is being unscrewed, the space 21 is closed up and another space 22, shown by dotted line, is formed on the opposite side of the bolt. This is caused by the rolling of the locking member 25 around its ridge 31 in the groove 32. When the nut is being unscrewed the friction set up in the threads will cause this swinging or rolling. As, however, the top face of the ledge 29 contacts with the corresponding face of the channel, so that the locking piece is restrained from upward, axial displacement with the nut, the ends of the threads at 21 will not register with those of the bolt. Thus all further turning of the nut is prevented. By the insertion of a spring washer under the nut its slight turning may be compensated for.

In Fig. 5 of the drawing, still another modification has been shown. In this case the recess of the bolt 33 does not extend to the end thereof but commences a short distance down the same and the distance between the top 34 and bottom 35 of the recess is preferably less than the thickness of the nut 36, while the length of the locking member 37 is less than the length of the recess permitting a slight axial displacement of the member therein. As before the ridge 40 separates the two flat faces 38 of the locking member 37. These flat faces are set at an angle to each other as already described and run parallel to the axis of the bolt, as does also the rear wall 39 of the recess.

When an attempt is made in this modification to unscrew the nut, the locking member 37 will be axially displaced until its top end abuts against the top face 34 of the recess when the locking will occur and no further turning of the nut will be possible. The difference in height of the locking piece 37 and the recess in the bolt is, for the sake of clearness, shown excessive. As a matter of fact the locking piece has an easy fit in the recess, both being practically of the same height.

This last modification has several advantages over the first described arrangement, namely, the assembling of the parts is facilitated; the locking device is completely concealed, the bolt and nut having exactly the same appearance as an ordinary bolt and nut; and the lock is permanent as the nut cannot be removed as long as the locking member 37 is in position and the latter cannot be reached from the outside. The only way of getting the pieces apart is to cut the bolt or destroy the threads. Consequently this last named modification is particularly advantageous for permanent structures or machines.

Instead of running the top and bottom faces 34 and 35 perpendicular to the bolt axis as shown, they may be inclined upwardly and outwardly with the filling piece or locking member 37 correspondingly shaped. When the latter is raised to lock as shown in Fig. 5, it will thus be forced deeper into the threads of the nut.

What is claimed as new is:

1. In a nut locking device, the combination with a threaded bolt and nut, of a locking member correspondingly threaded, a recess being formed on one side of the bolt for housing the locking member, interengaging means in said recess and member adapted to limit the axial displacement of said member, said means comprising interengaging abutment elements placed at an acute angle to the direction of the threads.

2. In a nut locking device, the combination with a threaded bolt and nut, of a locking member correspondingly threaded, a recess being formed on one side of the bolt for housing the locking member, interengaging means in said recess and member adapted to limit the axial displacement of said member, a hinge connection between said locking member and the back wall of the recess, said back wall and the adjacent side of the locking member diverging from each other in radial direction from the axis of said hinge connection.

3. In a nut locking device, the combination with a threaded bolt and nut, of a locking member correspondingly threaded, a recess being formed on one side of the bolt for housing the locking member, interengaging means in said recess and member adapted to limit the axial displacement of said member, a hinge connection between said locking member and the back wall of the recess, said back wall and the adjacent side of the locking member diverging from each other in radial direction from the axis of said hinge connection; said interengaging means comprising a substantially transversely running element on the locking member engaging a corresponding surface in the recess.

In testimony whereof we affix our signatures.

ROBERT R. CHILDS.
GUSTAV H. JAKOBSSON.